United States Patent [19]

Overcash et al.

[11] Patent Number: 4,616,504

[45] Date of Patent: Oct. 14, 1986

[54] THROTTLE POSITION SENSOR

[75] Inventors: Donald A. Overcash, San Juan Capistrano; Lloyd E. Hall, Fullerton; Guenter W. Mueller, Santa Ana, all of Calif.

[73] Assignee: Duncan Electronics, Costa Mesa, Calif.

[21] Appl. No.: 594,758

[22] Filed: Mar. 29, 1984

Related U.S. Application Data

[63] Continuation-in-part of Ser. No. 491,220, May 3, 1983, abandoned.

[51] Int. Cl.⁴ .......... G01M 15/00

[52] U.S. Cl. .......... 73/118.1; 338/184; 338/318

[58] Field of Search .......... 73/116, 117.3, 118; 123/472, 494; 338/184, 315, 318, 333

[56] References Cited

U.S. PATENT DOCUMENTS

| | | |
|---|---|---|
| 2,104,020 | 1/1938 | Cadman . |
| 2,734,975 | 2/1956 | Goss, Jr. . |
| 2,740,026 | 3/1956 | Budd et al. . |
| 2,810,809 | 10/1957 | Barden . |
| 2,839,642 | 6/1958 | Dickinson et al. . |
| 2,857,496 | 10/1958 | Louis . |
| 2,863,029 | 12/1958 | Wholly . |
| 2,863,972 | 12/1958 | Barton . |
| 2,866,876 | 12/1958 | Cohen . |
| 2,899,662 | 8/1959 | Barden et al. . |
| 3,045,200 | 7/1962 | Hines et al. . |
| 3,102,990 | 12/1963 | Miller et al. . |
| 3,111,640 | 11/1963 | Dial . |
| 3,134,084 | 5/1964 | Shriro . |
| 3,222,629 | 12/1965 | McCann . |
| 3,266,004 | 8/1966 | Fox et al. . |
| 3,303,453 | 2/1967 | Doering, Jr. . |
| 3,323,094 | 5/1967 | DeLucca et al. . |
| 3,406,367 | 10/1968 | Maquire . |
| 3,518,604 | 6/1970 | Beaver et al. . |
| 3,880,125 | 4/1975 | Kammerer et al. . |
| 3,909,769 | 9/1975 | Rozema et al. . |
| 3,943,891 | 3/1976 | Kinugawa . |
| 3,997,865 | 12/1976 | George . |
| 4,149,494 | 4/1979 | Wolfinger et al. . |
| 4,205,377 | 5/1980 | Oyama et al. . |
| 4,217,863 | 8/1980 | Ezoe . |
| 4,355,293 | 10/1982 | Driscoll .......... 123/494 X |
| 4,359,894 | 11/1982 | Ikeura et al. . |
| 4,364,363 | 9/1982 | Miyagi et al. . |
| 4,383,514 | 5/1983 | Fiala . |
| 4,391,250 | 7/1983 | Matsui . |
| 4,505,151 | 3/1985 | Sauerschell et al. .......... 73/116 |

*Primary Examiner*—Jerry W. Myracle

*Attorney, Agent, or Firm*—Knobbe, Martens, Olson & Bear

[57] ABSTRACT

A throttle position sensor having a potentiometer module which fits into a connector casing for mounting on a carburetor or and air-fuel mixture control system for an internal combustion engine. The position sensor assembly is mounted such that movement of the butterfly valve and thus the throttle, acts to move the wiper element of the potentiometer in a predictable manner. The modules can be tested independently of the casing and rejected without unnecessary waste. Additionally, the same potentiometer module can be used with different connector casings. The potentiometer module includes a one piece casing having an integrally formed cantilever bearing system with two spaced bearing surfaces for rotatably mounting the rotor holding the potentiometer wipers and a "pilot diameter" boss aligned with the axis of rotation of the rotor. Longitudinal movement of the rotor within the casing is limited by position two stop members on either side of an annular ridge extending outwardly from the rotor.

29 Claims, 14 Drawing Figures

Fig. 13
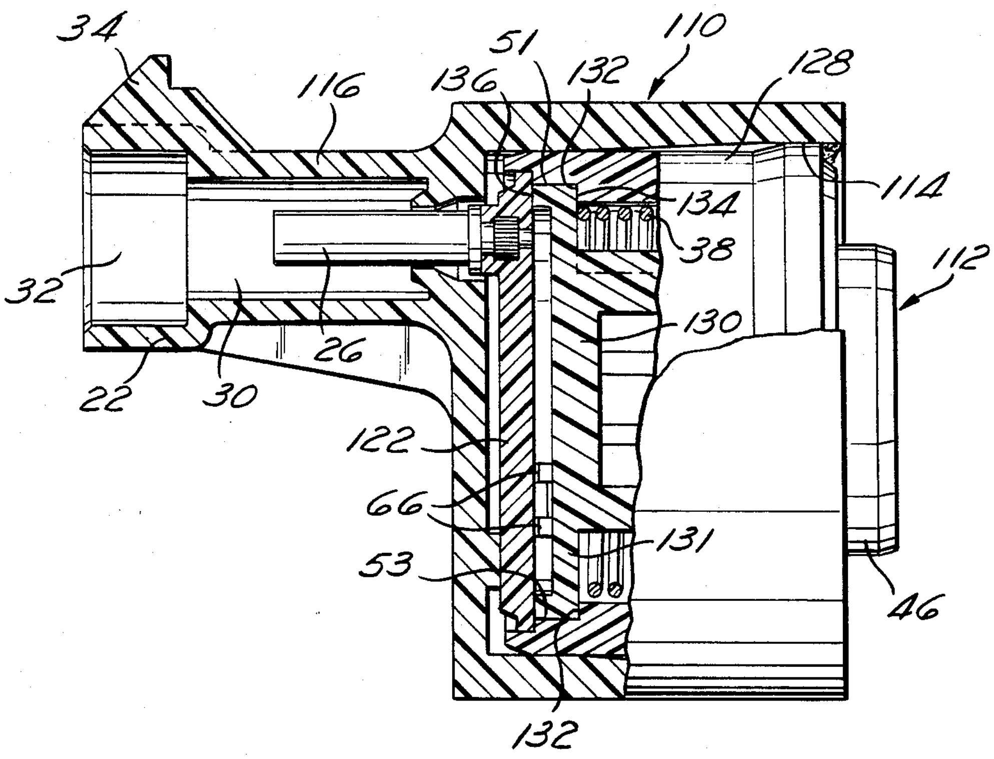
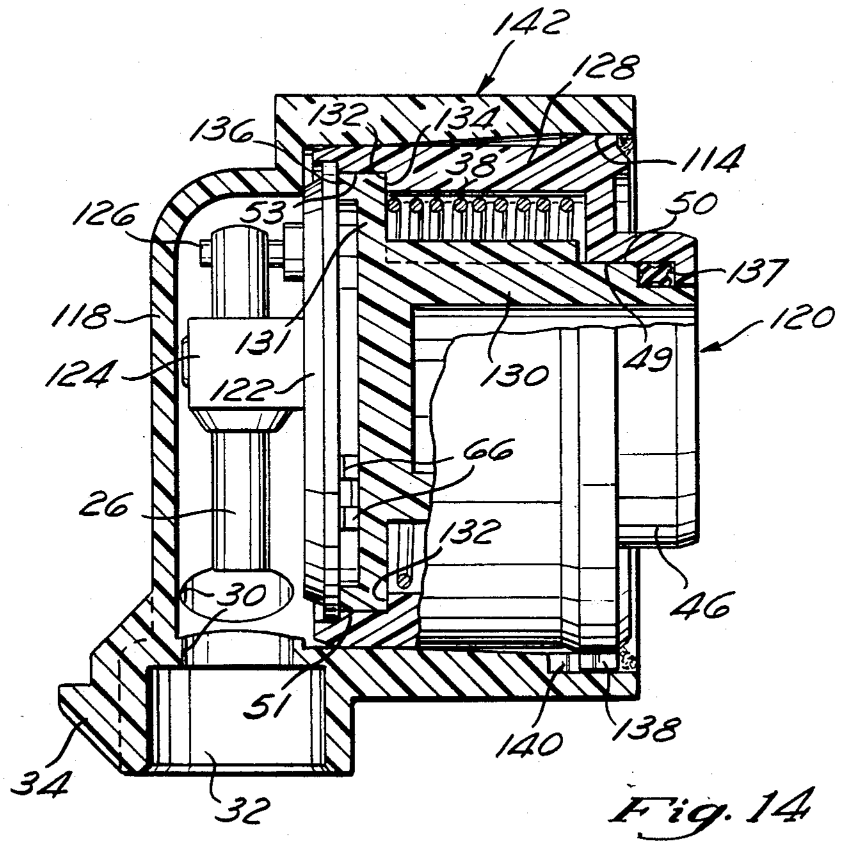
Fig. 14

THROTTLE POSITION SENSOR

CROSS REFERENCE TO RELATED APPLICATIONS

This application is a continuation in part of application Ser. No. 491,220 filed May 3, 1983 now abandoned and entitled "THROTTLE POSITION SENSOR". The parent application Ser. No. 491,220 referred to above is hereby incorporated by reference.

BACKGROUND OF THE INVENTION

This invention relates to the field of throttle position sensors and more particularly to a potentiometric device for determining the position of the butterfly valve in the carburetor of an internal combustion engine.

Throttle position sensors are known in the art for sensing the position of the butterfly valve of the carburetor and thus the position of the throttle. This information is typically used to control a fuel injection system or as one input of an electronic system for monitoring engine performance. Such a system can, for example, aid in improving gas mileage. The term "butterfly valve" is used broadly throughout this specification to refer to any fuel control apparatus.

Prior art potentiometric throttle position sensors are generally characterized by a single assembly in which stationary resistive element and movable wiper contacts connected to a rotor are mounted within a two piece casing. The rotor is mounted for rotation in the casing by using two bearings mounted in the casing at opposite ends of the rotor. One end of the rotor sticks out of the casing slightly and is provided with a actuator arm that makes contact with a similar amr connected directly to the butterfly valve. The connection is such that when the butterfly valve is opened the actuator arm is rotated, which in turn acts to rotate the rotor.

In order to prevent the possibility that failure of the sensing element might possibly lock the butterfly valve in an open throttle position, safety regulations require that there be no direct connection between the potentiometer and the butterfly valve. Thus the movement of the arm connected to the butterfly valve only acts to rotate the rotor when the throttle and butterfly valve are being opened and the rotor is not directly rotated by the closing movement of the butterfly valve. However, it is desirable to follow the rotation of the butterfly valve when it closes so that an accurate indication of the position of the throttle is given. This is provided by a torsion spring inside the throttle position sensor casing concentric with the rotor. The torsion spring is tensioned such that as the butterfly valve closes the rotor will be turned to follow this movement.

These prior art potentiometric sensors have certain disadvantages. For example, the fact that the rotor is mounted with dual bearings in the casing, one at each end, makes alignment of the rotor very difficult. Proper alignment requires both that the rotor be concentric with the bearings and that the rotor be perpendicular to the plane of the resistive element. Where one or both of these requirements are not met, the potentiometer can exhibit "geometry" errors, i.e., the amount of movement of the wiper contacts over the resistive element for a given number of degrees (for example 10°) may vary depending upon the relative position of the wiper contacts upon the resistive element. In some applications this accuracy can be crucial. Furthermore, the structural configuration of the prior art devices are such that manufacturing tolerances can easily result in misalignment between an external "pilot" diametric integral with the case of the position sensor and the rotor's axis of rotation. As a result, it is either not possible to properly attach the sensor to the carburetor or only be expending additional time during the assembly of the units.

Additionally, because the rotor uses two bearings located one at each end of the rotor, the connector terminals must be located off to the side of the rotor. In addition, position sensors made as single assemblies have the disadvantage that, if after testing it is determined that the potentiometer is defective, the entire assembly must be disposed of or re-worked.

SUMMARY OF THE INVENTION

The present invention makes substantial improvements in the field of throttle position sensors and in so doing overcomes the the disadvantages mentioned above with respect to the prior art position sensors. Moreover, the present invention is particularly adapted to the high volume, low cost manufacturing necessary to supply the needs of the automobile industry but without sacrificing quality or functional accuracy of the throttle position sensor.

The throttle position sensor of this invention is made up of two component parts. One part is the potentiometer module and the other is the mounting case. The potentiometer module contains the potentiometer structure and includes linkage structure at one end to link the movement of the potentiometer rotor with that of the butterfly valve. The other end generally includes three electrical terminals, two of which are connected to the end terminals of the resistive element of the potentiometer and the third of which are connected to the movable wiper contact. The potentiometer module will be discussed in more detail below.

The mounting case is the second component part and is shaped to fit in the desired location on the carburetor. The mounting case includes an opening for receiving the potentiometer module. This opening is arranged such that when the mounting case is secured in the desired location on the carburetor, the potentiometer module is positioned to link up with the butterfly valve.

There are a number of advantages to having two separate elements. For example, after the two components are manufactured, the potentiometer module can be separately tested. If it turns out that the potentiometer module is faulty, this particular module can be rejected and thrown out without wasting the mounting case. Another advantage is that the same potentiometer module can be used with different mounting cases so as to fit different shapes and sizes of carburetors.

The potentiometer module itself is constructed of a single unitary tubular casing having two ends. This module casing is advantageously molded. The first end is intended to be pointed towards the linkage with the butterfly valve and has the appropriate linkage structure including a pilot diameter to help position the module in precisely the proper position. The second end supports a flat resistive element and external electrical terminals advantageously arranged symmetrically about the central axis of the tubular casing. Inside the module casing is a concentrically positioned rotor. The rotor is mounted within the tubular casing for rotation by a cantilever bearing system including one bearing surface located towards the resistive element end of the casing and another located towards the linkage end of the casing. This leaves the end of the rotor facing the resistive element free for use as a wiper contact holder.

The use of the cantilever bearing system provides several significant advantages. Due to the cantilever bearing, the resistive element can be simplified to a circular substrate which on one side permits the silk screened resistive pattern over which the wipers pass and on the outside supports the three electrical terminals. All of these elements, the terminals, resistive element, and the rotor can be constructed close to the center axis of the cylindrical module casing thus substantially reducing the bulk of the potentiometer over that of the prior art.

Furthermore, by using the cantilever bearing for rotatably mounting the rotor, accuracy of the potentiometer is more easily and less expensively obtained. This is because the two bearing surfaces which make up the cantilever bearing are formed in the single piece casing and not in two separate pieces. As a result geometry errors, due to the rotor being somewhat aconcentric and somewhat off the normal with respect to the plane of the resistive element, can be more easily controlled. In the dual bearing device of the prior art, where the bearings are typically located at opposite ends of the rotor in respective halves of a two-piece casing, proper alignment is very difficult. This is because the two pieces, of necessity, are manufactured in two different molds and then assembled in a later operation. In contrast the present invention provides a less expensive, more accurate position sensor by using a single casing for the bearing surfaces and the pilot diameter, thereby eliminating the need for a separate alignment step between the two bearing surfaces and the pilot diameter at the assembly stage.

In another aspect of the invention the end play of the rotor (i.e. the movement of the rotor in a direction parallel to its rotational axis within the module) is controlled by providing an annular recess in the casing adjacent the bearing surface located toward the resistive end of the casing. The rotor has a mating annular protrusion adapted to fit into the recess. Because the distance between the resistive element and the edge of the recess is small the accuracy of the end play tolerances can be more easily maintained. This is due to the fact that as the molded casing is cooled there will unavoidably be some shrinkage. By providing only a very short distance between the two limit stops the effect of shrinkage on the tolerances will be minimized.

Thus this invention provides a more accurate and compact position sensor than has been previously available in the art. The use of a single, unitary potentiometer module casing for providing both an integrally formed cantilever bearing system for the rotor and an external pilot diameter for properly positioning the sensor makes precise alignment between the rotor's axis of rotation and the external pilot diameter more easily attainable. Accuracy of both bearing alignment and pilot diameter are easily maintained by virtue of the fact that this casing is molded as a single unit whereas the prior art position sensors employ a two-piece construction with the rotor being supported by bearing surfaces located in the mating pieces. Manufacturing tolerances can easily result in misalignment of these bearing surfaces, resulting in both geometry errors for the potentiometer and misalignment of the "pilot" diameter. Furthermore, a position sensor is provided by the instant invention which reduces the cost of manufacture by providing a potentiometer module which can be tested separate and apart from the mounting case so that should the module prove faulty, only the module will need be disposed of. Finally, this separation of the module and the casing permits one module to be used for a plurality of different casings.

BRIEF DESCRIPTION OF THE DRAWINGS

FIG. 13 shows a partial cross-sectional view of a second alternate embodiment of the throttle position sensor; and FIG. 14 shows a partial cross-sectional view of a third alternate embodiment of the throttle position sensor.

DETAILED DESCRIPTION OF THE INVENTION

Figure 1:
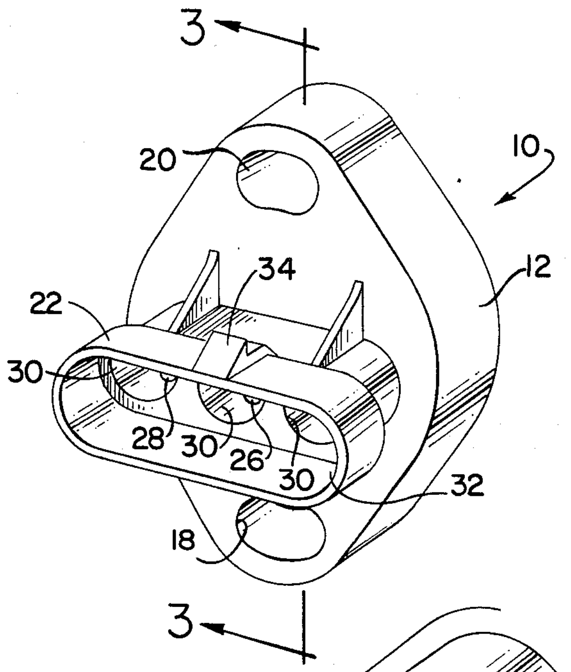
FIG. 1 shows a perspective front view of a throttle position sensor constructed in accordance with the present invention.

Referring now to FIGS. 1-7, the throttle position sensor 10 includes an outer mounting case 12 and an inner potentiometer module 14. The potentiometer module 14 is shown in an exploded format in FIG. 2, and assembled in FIG. 3. The mounting case 12 is formed of one piece of polyester materials and includes a mounting surface 16 and two mounting apertures 18, 20 for securing the assembled position sensor in its proper location on a carburetor. Extending from the side opposite the mounting surface 16 is a connector housing 22 for the female portion of a connector. When the position sensor 10 is fully assembled, the three electrical prongs 24, 26, 28 extend into the connector housing 22.

The female connector 22 is adapted to sealingly mate with a corresponding male connector (not shown). The narrow portions 30 of the opening in the housing is adapted to accept the male portion of a mating connector. The opening in the housing widens to form a wide mouth 32 at a point close to the outside of the connector housing to accept a flexible sealing element which is carried by the male portion of the connector. The seal prevents dirt and moisture from interfering with the connection. In addition, on the outside and to the side of the connector housing there is a locking ridge 34 that accepts a spring locking mechanism from the male portion of the connector (not shown) and acts to lock the two portions of the connector in their proper positions.

The potentiomater module 14 is constructed separately from the mounting case 12. This permits the module to be tested independently of the casing so that should a module be rejected, only the module need be disposed of or reworked and not the entire position sensor. Additionally, by constructing the potentiometer module 14 separately from the mounting case 12, the same potentiometer module may be used with differently shaped mounting cases. This can be a particularly useful feature where differences in the mounting case are required due to the requirements of mounting in various different carburetors.

The potentiometer module 14 includes four elements, a unitary cylindrical casing 36, a torsion spring 38 fitting into the cylindrical casing 36, a rotor 40, and a substrate element 42. These elements are shown in an exploded perspective view in FIG. 2. The cylindrical casing 36 has at one end a flat annular surface 44 from which extends a cylindrical boss 46 having a smaller diameter than the main portion of the cylindrical casing. The diameter of this integrally formed boss 46 is used as the "pilot diameter" to mate with a cylindrical collar (not shown) on the carburetor to precisely center the throttle position sensor relative for example, to an arm connected to the butterfly fly valve.

Just inside the cylindrical casing 36 on the side proximate the pilot diameter boss 46 is a cylindrical element 48 for providing one bearing surface 49 rotatably supporting the bearing surface 50 of the rotor 40. Just inside the cylindrical casing on the side opposite the pilot boss 46 is a bearing surface 53 for rotatably supporting the cylindrical surface 51 of the rotor 40. Thus the single piece cylindrical casing 36 provides the two spaced cylindrical bearing surfaces 49 and 53 for the cantilever bearing system of the present invention.

It is important at this point to note that the two bearing surfaces 53,49 as well as the cylindrical pilot boss 46 which acts to aid in aligning the throttle position sensor with an arm connected to the butterfly valve are all formed in the one piece casing 36. A major advantage of this one piece construction is that alignment of the bearing surfaces 53, 49 and the pilot boss 46 takes place during the molding process and not during the stage at which the pieces are put together. This feature acts to substantially reduce the manufacturing costs over those of previous potentiometers and in addition makes possible alignment tolerances which are on order of magnitude greater than has been possible in the past.

Movement of rotor 40 parallel to its rotational axis, commonly called "end play", is limited so that the rotor 40 is maintained in the proper position within the casing 36. In particular movement of the rotor 40 in a direction towards the pilot diameter 46 is limited by annular ridge 55 of the casing 36 which abuts the corresponding annular ridge 57 of the rotor 40. Movement in the opposite direction is restricted by annular ridge 59 of the rotor abutting against the inner end surface of the substrate 42.

The cylindrical casing 36, including bearing surfaces 49, 53 and pilot boss 46 is advantageously molded of polyester resin, and the rotor 40 is advantageously molded of polyphenal sulfide. In addition particles of TEFLON® are advantageously added as part of the material which forms both casing 36 and rotor 40 to provide better bearing surfaces.

Figure 3:
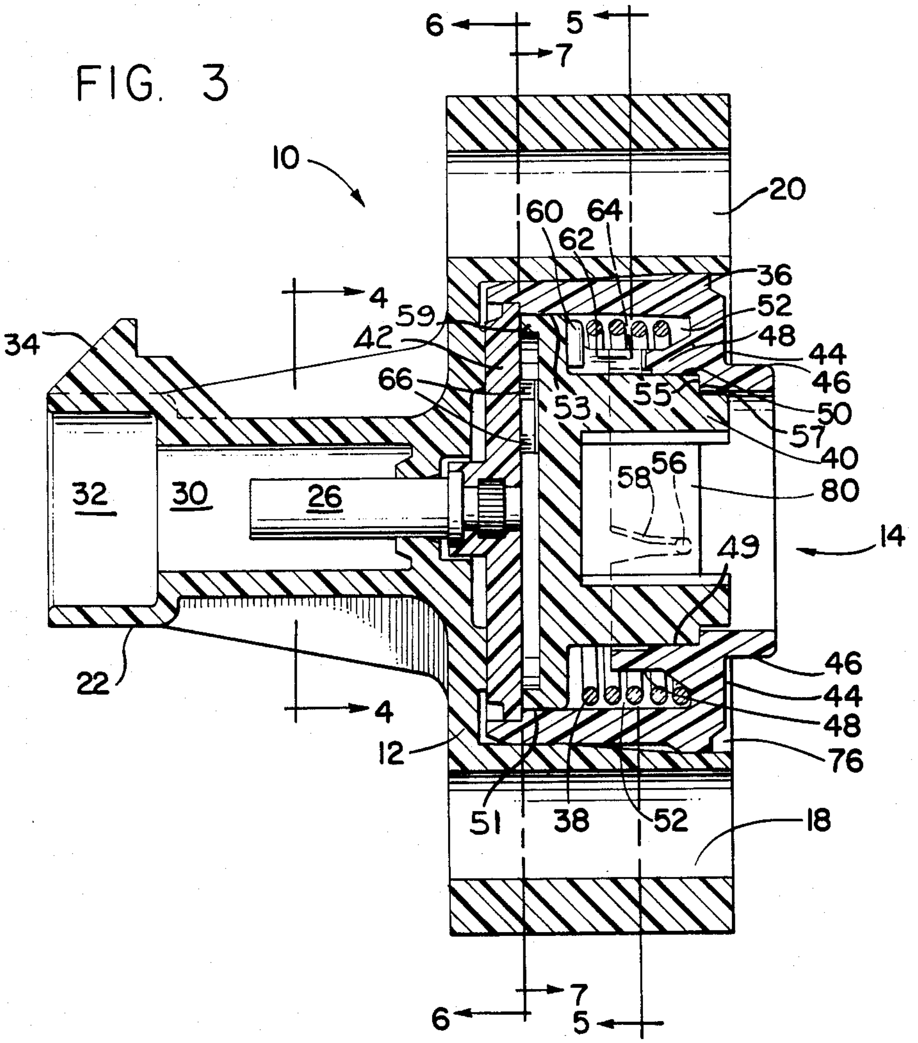
FIG. 3 is a cross-sectional view of the assembled sensor taken along line 3—3 of FIG. 1 extending through the middle of the sensor from the front to the rear.
Figure 4:
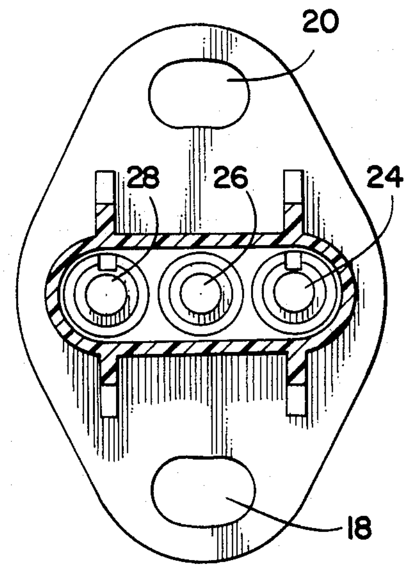
FIG. 4 is a cross-sectional view taken along line 4—4 of FIG. 3 and shows the connector prongs and mounting holes.
Figure 5:
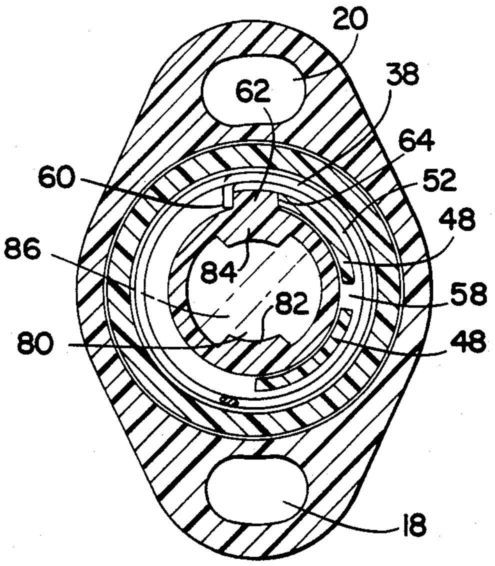
FIG. 5 is a cross-sectional view taken along line 5—5 of FIG. 3 and shows some details of the potentiometer module.

A torsion spring 38 is located in a concentric annular recess 52 formed interior of the cylindrical casing 36, as best seen in FIG. 3. A first ear 56 of the torsion spring is placed in a slot 58 (see FIG. 3) formed in the bearing cylinder 48. The other end of the spring has a second ear 60 which fits against a protrusion 62 on the side of the rotor 40.

The cylindrical bearing element 48 is formed such that about half of the circumference of the cylindrical bearing element extends into the potentiometer casing further than the other half of the cylindrical bearing element. This forms a ridge 64 which abuts against the protrusion 62 from the rotor 40 to limit the rotational travel of the rotor 40. In the specific embodiment shown, this rotation is limited to approximately 180°. The second ear 60 of the spring which is at the end of the spring opposite the pilot diameter cylindrical element 46 fits against the protrusion 62 from the rotor 40 and is torsioned to hold the rotor 40 in position against the ridge 64 formed by the cylindrical bearing element 48. Thus when the rotor 40 is rotated against the torsional force applied by spring 38, protrusion 62 will move away from ridge 64. When released the spring 38 will immediately return the rotor 40 to its original position with protrusion 62 abutting against the ridge 64.

Figure 7:
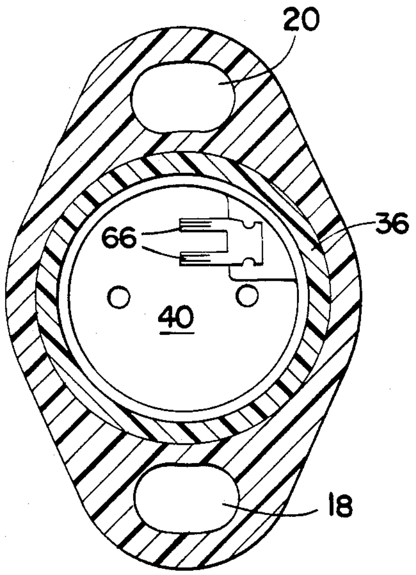
FIG. 7 is taken along line 7—7 of FIG. 3 and shows further details of the potentiometer module structure.

The top of the rotor 40 is equipped with electrical wiper contacts 66 best seen in FIGS. 3 and 7. The positioning of the wiper contacts directly on the end of the rotor is made possible by the use of the cantilver bearing to mount the rotor. This permits the potentiometer module to be made very compact, reducing the cost of materials and manufacture as well as making efficient use of available space. Additionally, as noted above, the use of the cantilever bearing makes alignment easier because the two bearing surfaces 49 and 53 making up the bearing are both advantageously formed in a single piece casing 36. As a result geometry errors are minimized.

Figure 6:
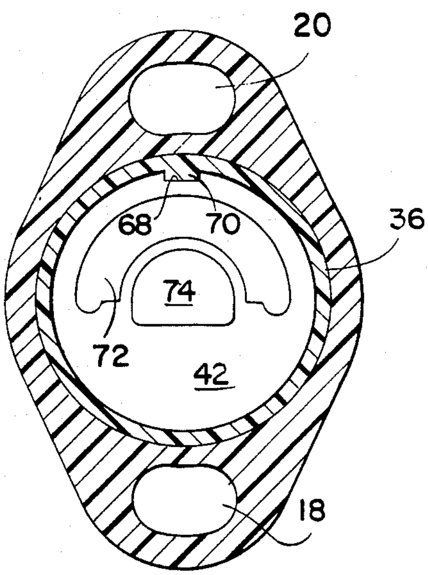
FIG. 6 is a cross-sectional view taken along line 6—6 of FIG. 3 and shows further detail of the potentiometer module.

The final element of the potentiometer module 14 is the substrate disc element 42 which covers the end of the module. Substrate 42 is a circular disk advantageously made of polyphenal sulfide. The disk 42 has a key slot 68 on its edge which matches a key 70 protruding from the interior of the cylindrical potentiometer casing 36. This is best seen in FIG. 6. Three pins 24, 26, 28 for the three-pronged connector are molded directly into the substrate element 42. On the side of the resistive element facing the rotor 40, a portion of each of the three pins 24, 26, 28 is exposed on the interior surface. An arc 72 of resistive phenolic material is then silk screened in a conventional manner over selected portions of the interior surface of the resistive element, covering the exposed portions of two of the three prongs, thereby providing end terminations at the two outside electrical terminals 24, 28. Concentric with the arc 72 but spacd therefrom a half circular portion of conductive material 74 is formed in contact with the middle electrical terminal 26.

The wiper contacts 66 are advantageously made of a nickel-copper-zinc alloy (CA 770) and are heat staked onto the end surface of the rotor 40. These wiper contacts 66 engage conductive material 74 and provide a movable electrical contact with the resistive element 72. Thus if a potential is applied across the two outer terminals 24, 28, the voltage appearing at the middle terminal 26 will vary as the rotor 40 and thus the wiper contacts 66 are rotated. This change in potential is used to determine the angular position of the rotor 40.

The potentiometer module 14 described above is advantageously completed and pre-tested before attachment within opening 76 in the mounting case 12. As shown, the exterior dimension and the interior dimension of the case 12 are sized to provide a snug fit. The three electrical terminals 24, 26, 28 fit through three holes 78 in case 12 to extend into the connector housing 22 and act along with the housing to form a complete female connector element. The potentiometer module 14 is held in place in case 12 by an appropriate cement such as an epoxy resin.

LINKAGE TO THE CARBURETOR

In the embodiment shown in FIGS. 1–7, the linkage between the rotor and the butterfly valve begins on the rotor side with an opening 80 having two oppositely disposed protrusions 82, 84. The opening 80 is otherwise cylindrical. The protrusions 82, 84 are located such that a blade 86 (shown in dotted lines in FIG. 5) directly connected to the rotating butterfly valve may be inserted into the cylindrical opening 80. One side of the blade 86 will contact one of the protrusions 82, and the other side of the blade 86 will contact the other protrusion 84 such that in the direction that the butterfly valve turns to open, the blade will act to forcibly turn the rotor 40 against the torsion of the torsion spring 38. If the rotor 40 should, for any reason, become stuck at any angle of rotation, it can be seen that the blade 86 is free to rotate back to the closed position, away from contact with the protrusions 82, 84 inside the cylindrical opening 80. Under normal circumstances, spring 38 acts to move the rotor 40 back to a closed position as the blade 86, which is directly connected to the butterfly valve, returns to its closed position.

ALTERNATE LINKAGE

Figure 11:
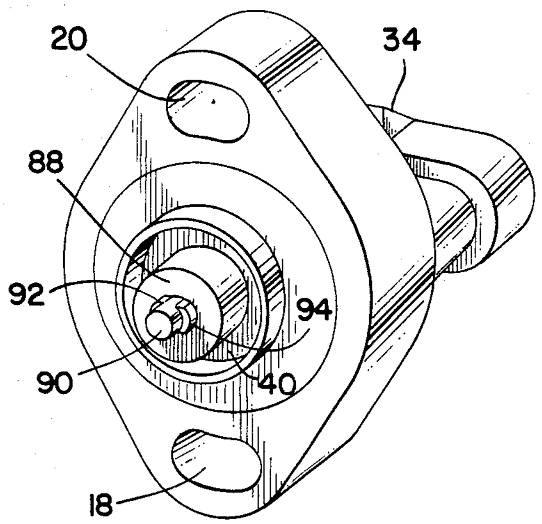
FIG. 11 shows a rear perspective view of the throttle position sensor of FIG. 1 with modified linkage.
Figure 12:
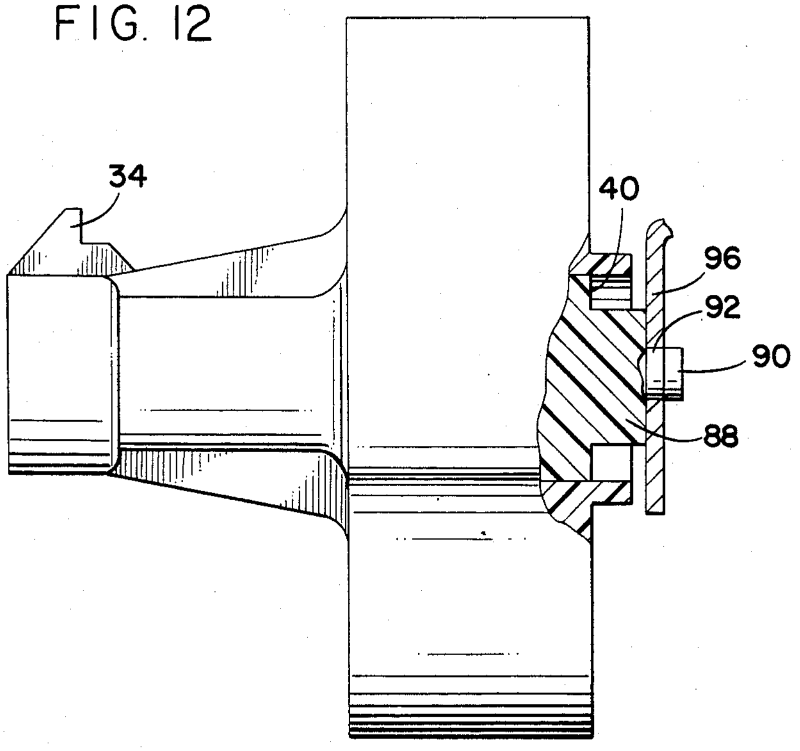
FIG. 12 shows a partially sectional view of the modified throttle position sensor of FIG. 11.

FIGS. 11 and 12 show an alternate linkage between the butterfly valve and the rotor 40. The other parts of the throttle position sensor are identical to those already discussed. Thus FIGS. 11 and 12 show a protruding cylinder 88 with a smaller cylinder 90 extending therefrom. Two ears 92, 94 are located on either side of the cylinder to accept an actuator arm 96. It can be seen that as the actuator arm 96 turns, the rotor will turn. This actuator arm 96 can be secured to the rotor 40 in any well-known way, including heat staking and/or by a push-nut fastener (not shown). The carburetor has a similar actuator arm (not shown) connected directly to the butterfly valve. When these are aligned properly, the actuator arm of the butterfly valve will, as the throttle is opened, turn and push against the actuator arm 96 of the rotor 40, thus turning the rotor 40. When the butterfly valve begins to close, the actuator arm of the butterfly valve will move in the other direction. At this point, if the rotor 40 for some reason is stuck, the butterfly valve actuator arm is free to move away from the rotor actuator arm 96, permitting the throttle to close. Of course, in the normal situation the actuator arm 96 of the rotor will follow the movement of the actuator arm of the butterfly valve due to the torsion spring 38 which acts to keep torsion on the rotor 40 towards a closed position.

ALTERNATE EMBODIMENTS

Figure 8:
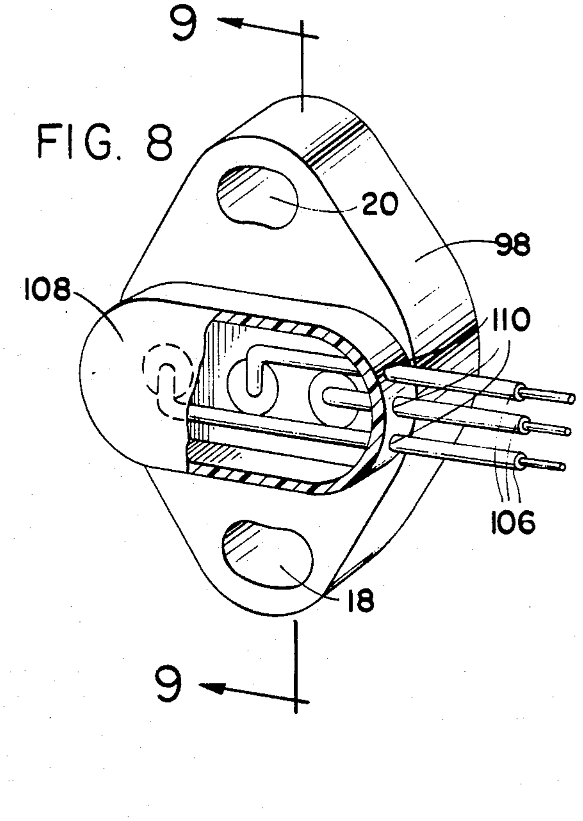
FIG. 8 shows a perspective front view of an alternate embodiment of the throttle position sensor showing three leads exiting from the side of the sensor.
Figure 9:
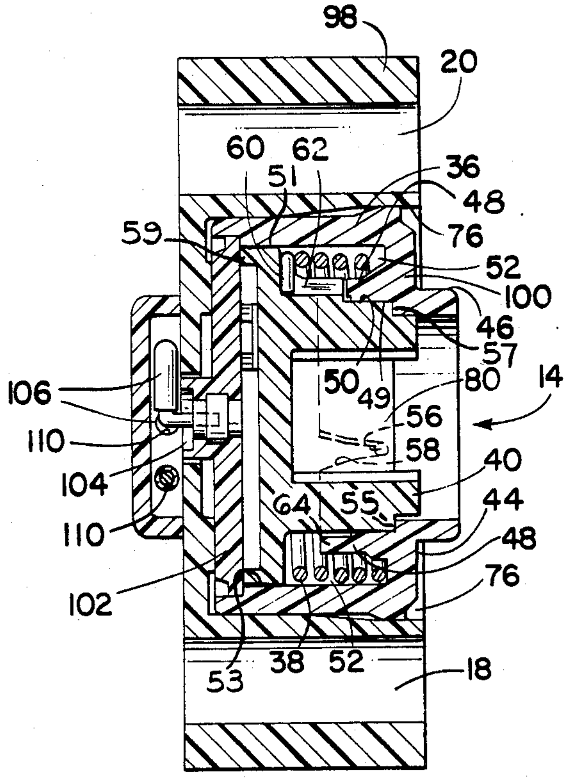
FIG. 9 is a cross-sectional view of the modified throttle position sensor of FIG. 8 taken along a line running from the front to the rear of the sensor.
Figure 10:
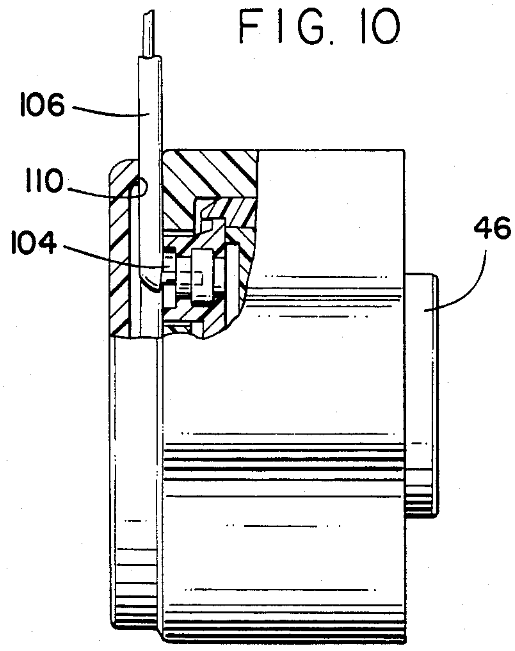
FIG. 10 is a partially sectional top view of the throttle position sensor of FIG. 8.

FIGS. 8, 9, and 10 show an alternate embodiment for the throttle position sensor of the present invention. The mounting case 98 and the potentiometer module 100 may be essentially the same as in the embodiment of FIGS. 1–9 (like parts are numbered with the same numbers used previously). However, with respect to the resistive element 102, the terminals 104 that are molded in the resistive element 102 are not prongs, but rather provide through terminals for wires 106 soldered on the other side of the substrate disc. As shown, these wires 106 emerge from the side opposite that which is to be connected to the butterfly valve linkage. The mounting case 98 itself has a flat, oblong container 108 for accepting the wires 106. During assembly, the wires from the potentiometer module 100 are threaded through, and into, the oblong container 108 on the top of the mounting case, and out the three holes 110 on the side of the oblong container. As in the earlier described embodiment, the potentiometer module 100 is secured within the opening 76 in the mounting casing using any well-known cement.

FIGS. 13 and 14 depict two additional alternate embodiments. In these drawings like elements already described with respect to the previous embodiments are indicated by the same numerals. The embodiments of FIGS. 13 and 14 function in a manner quite similar to the previously described throttle position sensor embodiments. In particular the embodiments of FIGS. 13 and 14 includes mounting cases 110 and 142 respectively and potentiometer modules 112 and 120 which fit snugly into openings 114 in mounting cases 110 and 142. As is the case in all of the embodiments disclosed the potentiometer modules 112,120 are advantageously constructed and tested separately from the mounting cases 110,142 and then assembled into one piece by simply inserting the potentiometer modules into the openings 114. As is the case in the previous embodiments the modules may be advantageously secured in place using any readily available cement including epoxy resin.

Figure 2:
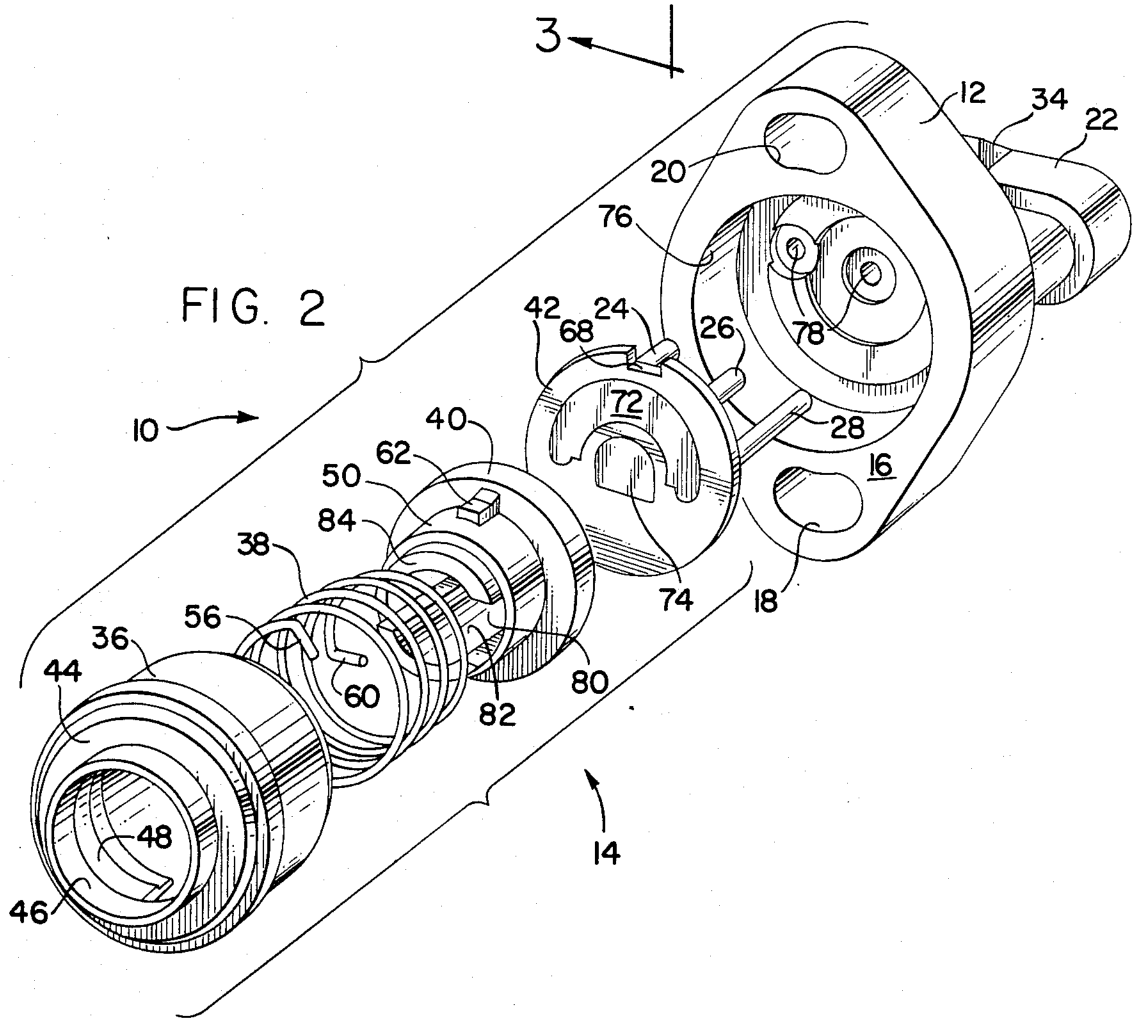
FIG. 2 shows a perspective rear view of the throttle position sensor with the mounting case and the parts of the potentiometer module displayed in an exploded format.

The mounting cases 110 and 142 are much like mounting case 12 of FIG. 2 except for the location of connector housings 116,118. As can be seen in the drawing of FIG. 13 the connector housing in the embodiment of FIG. 13 is arranged not in the middle of the casing, but at one edge of the casing. It can be seen that except for the difference in position of the connector housing that the connector is otherwise the same as the connector previously described in connection with the embodiment of FIG. 2. The connector housing 118 of FIG. 14 is different from that of FIG. 13 in that it is mounted parallel to the end surface of the casing and extends from one edge of the casing to the other.

The Potentiometer modules 112 shown in FIG. 13 and 120 shown in FIG. 14 are substantially the same with the exception of the connectors. Each of the modules 112 and 120 have a circular substrate plate 122. In the case of module 112 the three connector elements of which only connector element 26 is shown in FIG. 13 are connected along one edge of the substrate 122 in the same manner as in the embodiment of FIG. 2. In the case of module 120 of FIG. 14 the three connector elements of which only connector element 26 is shown in FIG. 14 are arranged parallel to substrate 122 and are supported by support bracket 124. Three electrical connector posts, only one of which posts 126, is shown in the drawing are connected through substrate 122 in the same or similar manner and location as the three connector elements are connected in the FIG. 13 embodiment. The posts are electrically connected in any well-known manner to the connectors. Proper orientation of the modules 112 and 120 with respect to the mounting casings 110 and 118 is ensured by providing a protrusion 138 in the module casings 128 which mates with a notch 140 in the mounting casing. (See FIG. 14). The remaining portion of each of the modules 112 and 120 are the same and will be described together.

A resistive pattern is advantageously silk screened on the interior of substrate 122 such that it is in contact with the connector elements. The pattern is positioned such that as wipers 66 pass over the substrate a potentiometer function will be performed. A silk screen design similar to that used in the earlier described embodiment and shown in FIG. 6 can be used here with suitable modification due to the different position of the contacts passing through the substrate 122.

As was the case in the embodiment of FIG. 2 casing 128 provides dual bearing surfaces 53 and 49 for supporting the rotor 130 for rotation. As mentioned previously in connection with the embodiment of FIG. 2 it is necessary to limit the movement of the rotor 130 in a direction parallel to its rotational axis within the casing 28. This movement is commonly called "end play". In the case of the embodiments of FIGS. 13 and 14, movement of the rotor 130 toward the pilot diameter element 46 is limited by providing a annular ridge 131, extending radially from the rotor 130. Movement of the rotor 130 towards the pilot diameter is limited by the annular ridge 132 formed in the casing 128 which abuts against the annular surface 134 of the rotor's radially extending ridge 131. Movement of the rotor in the opposite direction, towards the substrate 122, is limited by the inner surface of the substrate 122 itself as it contacts the extending annular lip 136 of the rotor. The close proximity between the points in the module which limit the movement of the rotor make it easier to manufacture the casing 128 with close end play tolerances. This is because as the molded casing is cooled there is unavoidably some shrinkage and by reducing the distance between the two points limiting the rotor's end play to a very short distance the shrinkage will have very little effect on the tolerances. Advantageously the distance between the limiting elements 122 and 132 is less than half the distance from the substrate end of the casing 128 to the pilot boss 46 end, and preferably less than one-eighth of that same distance. In order to seal the interior of the module an elastomeric sealing ring 137 is included at the pilot diameter 46 end of the module between the surfaces of the rotor 130 and the interior surface of the pilot diameter element 46.

What is claimed is:

1. A throttle position sensor comprising:

a potentiometer module, said potentiometer module having:

a one piece casing with first and second ends; a rotor mounted on a cantilever bearing located within said casing, said cantilever bearing having two separated bearing surfaces formed in said casing, and two corresponding bearing surfaces formed on said rotor to form two mating sets of bearing surfaces, one of said sets of bearing surfaces being located adjacent said first end of said casing and the other of said sets being located adjacent said second end of said casing;

a resistive element mounted at the second end of said casing having terminals on the outside surface connected to a resistive pattern on the inside surface;

a set of wiper contacts mounted on said rotor for contact with said resistive pattern over the range of rotation of the rotor and arranged to provide a change in potential at said terminals proportional to the change in rotational position of the rotor;

a mounting case;

means for coupling said mounting case and said potentiometer module to form an assembled throttle position sensor; and said assembled sensor configured so as to be connectable to a throttle assembly.

2. The position sensor of claim 1 further comprising an annular ridge extending outwardly from said rotor, said annular ridge having two sides, one side facing said first end of said module casing and the other side facing the second end of said casing;

movement limiting members, fixed with respect to said module casing and positioned in the path of said annular ridge on both sides of said annular ridge for limiting movement of said rotor in a direction parallel to said rotor's axis of rotation.

3. The position sensor of claim 2 wherein said movement limiting elements are spaced apart by a distance which is less than one-half that of the distance from said first end of said module casing to the second end of said module casing.

4. The position sensor of claim 2 wherein said movement limiting elements are spaced apart by a distance which is less than one-eighth that of the distance from said first end of said module casing to the second end of said module casing.

5. The position sensor of claim 1 wherein said module casing includes a pilot diameter formed by said casing on said first end thereof in order to aid in positioning said sensor in its proper location.

6. The throttle position sensor of claim 1 wherein said wiper contacts are mounted on the end of said rotor facing said resistive element.

7. The throttle position sensor of claim 1 wherein said terminals are arranged in line with the end of said rotor.

8. The throttle position sensor of claim 7 wherein said terminals are arranged symmetrically about a line passing through the axis of rotation of the rotor.

9. The throttle position sensor of claim 1 wherein said coupling means includes an opening in said mounting case sized to snugly receive said potentiometer module.

10. The throttle position sensor of claim 9 wherein said terminals are prongs extending from the outside surface of said resistive element;

said mounting case having a mounting surface on one side and a connector housing on the other side, said prongs fitting into said connector housing to form the female portion of a connector when said potentiometer module and said mounting case are coupled together.

11. The throttle position sensor of claim 9 wherein said terminals are substantially flush with the outside surface of said resistive element;

one wire is electrically connected to each of said terminals;

said mounting case having a mounting surface on one side and a flat oblong housing on the other side, said housing having a plurality of apertures equal in number to the number of said wires, said apertures opening laterally of said housing;

said wires fitting into said housing and through said apertures when said potentiometer module and said mounting case are coupled together.

12. The throttle position sensor of claim 1 including means for permitting mechanical connection between said rotor and a carburetor butterfly valve.

13. The throttle position sensor of claim 12 wherein said connection means includes a cylindrical opening in said potentiometer module, said opening having two opposing protrusions on the side wall thereof such that a blade may be inserted and turned to rotate said rotor.

14. The throttle position sensor of claim 12 wherein said connection means includes a cylindrical element extending from the mounting side of said potentiometer module, said cylindrical element being connected to said rotor such that when turned said rotor turns, and means for attaching an actuator arm to said cylindrical element.

15. A throttle position sensor comprising:

a potentiometer module having a molded unitary casing;

said unitary casing having two separated interior bearing surfaces formed as part of said casing for mounting a rotor and a pilot diameter formed as part of said casing in order to position said sensor in its proper location on an engine; and said throttle position sensor configured so as to be connectable to a throttle assembly.

16. A throttle position sensor comprising:

a sensor module having means for sensing the change in angle through which a device being monitored rotates;

a mounting case formed separately from said sensor module, said mounting case adapted to receive and hold said module, and having means for mounting the assembly of said module and said case in a desired location; and said throttle position sensor being configured so as to be connectable to a throttle assembly.

17. The position sensor of claim 16 wherein said mounting means includes a mounting surface on said mounting case and mounting apertures extending through said mounting case.

18. The position sensor of claim 16 wherein said mounting case includes the housing for the female side of an electrical connector said module having a plurality of prongs mounted such that when said module and said case are assembled, the prongs are positioned within said connector housing to form a complete female portion of a connector.

19. The position sensor of claim 18 wherein the means for sensing rotational movement includes a rotor mounted within said module, said prongs being arranged substantially symmetrically about a line which coincides with the axis of rotation of said rotor.

20. A throttle position sensor comprising:

a one piece casing having first and second ends, said casing having a first bearing surface formed as part of said casing and a second bearing surface aligned with said first bearing surface formed as part of said casing, said first and second bearing surfaces being spaced from one another;

a rotor having a first bearing surface designed to mate with said first bearing surface of said casing and a second bearing surface designed to mate with said second bearing surface of said casing, said rotor being mounted for rotational movement in said casing on said bearing surfaces; and said throttle position sensor configured so as to be connectable to a throttle assembly.

21. The throttle position sensor of claim 20 further comprising:

a resistive element mounted adjacent the second end of said casing;

a wiper contact mounted at the end of said rotor adjacent the second end of said casing so that the wiper contact engages the surface of the resistive element.

22. The throttle position sensor of claim 21 further comprising an annular ridge extending outwardly from said rotor, said annular ridge having two sides, one side facing said first end of said casing and the other side facing the second end of said casing;

movement limiting members, fixed with respect to said unitary casing and positioned in the path of said annular ridge on both sides of said annular ridge for limiting movement of said rotor in a direction parallel to said rotor's axis of rotation.

23. The throttle position sensor of claim 22 wherein said movement limiting elements are spaced apart by a distance which is less than one-half that of the distance from said first end of said casing to the second end of said casing.

24. The throttle position sensor of claim 22 wherein said movement limiting elements are spaced apart by a distance which is less than one-eighth that of the distance from said first end of said unitary casing to the second end of said unitary casing.

25. The throttle position sensor of claim 21 comprising:

a mounting case constructed separately from said potentiometer and having means for receiving and holding said potentiometer module to form an assembled position sensor.

26. The throttle position sensor of claim 21 wherein said resistive element has a resistive pattern on the interior surface and a plurality of terminals emerging from the outside surface electrically connected to said resistive pattern;

said terminals being arranged in line with the end of said rotor.

27. The throttle position sensor of claim 26 wherein said terminals are arranged symmetrically about a line passing through the axis of rotation of said rotor.

28. The throttle position sensor of claim 20 wherein said casing further includes a pilot diameter boss for providing precise alignment between said rotor and the throttle assembly to be monitored.

29. A throttle position sensor comprising:

a one piece casing having first and second ends, said casing having a first surface formed as part of said casing and a second surface spaced from and aligned with said first surface and also formed as part of said casing, said first surface forming a cylindrical bearing surface inside said casing and said second surface forming a cylindrical pilot diameter boss on the outside of said casing;

said pilot diameter boss providing precise alignment between said rotor and a throttle assembly to be monitored; and said throttle position sensor configured so as to be connectable to a throttle assembly.

* * * * *